United States Patent [19]
Deschenes

[11] Patent Number: 5,748,853
[45] Date of Patent: May 5, 1998

[54] VACUUM CLEANER WITH FUZZY LOGIC CONTROL UNIT

[75] Inventor: Laurent Deschenes, Saint-Germain-la-Blanche-Herbe, France

[73] Assignee: Moulinex S.A., Paris, France

[21] Appl. No.: 765,943

[22] PCT Filed: Jul. 7, 1995

[86] PCT No.: PCT/FR95/00909

§ 371 Date: Jan. 13, 1997

§ 102(e) Date: Jan. 13, 1997

[87] PCT Pub. No.: WO96/02179

PCT Pub. Date: Feb. 1, 1996

[30] Foreign Application Priority Data

Jul. 13, 1994 [FR] France .......................... 94 08705

[51] Int. Cl.⁶ .......................... G06F 17/00; A47L 9/28
[52] U.S. Cl. .......................... 395/61; 395/3; 395/900; 15/319; 15/339
[58] Field of Search .......................... 395/3, 61, 900; 15/319, 339

[56] References Cited

U.S. PATENT DOCUMENTS

| | | | |
|---|---|---|---|
| 4,977,639 | 12/1990 | Takahashi et al. | 15/319 |
| 5,233,682 | 8/1993 | Abe et al. | 395/61 |
| 5,243,732 | 9/1993 | Koharagi et al. | 15/319 |
| 5,255,409 | 10/1993 | Fujiwara et al. | 15/319 |
| 5,276,939 | 1/1994 | Uenishi | 15/319 |

FOREIGN PATENT DOCUMENTS

3-026223  1/1991  Japan .......................... A47L 9/28

*Primary Examiner*—Tariq R. Hafiz
*Assistant Examiner*—Jason W. Rhodes
*Attorney, Agent, or Firm*—Young & Thompson

[57] ABSTRACT

The vacuum cleaner includes a housing (2) having a dust compartment (11) containing a dust bag (17) and a vacuum compartment (12) containing a motor-ventilator set (20); a vacuum hose (3, 5) coupled to a suction unit (7) with a suction aperture; and a device (30) for automatically controlling the power of the motor-ventilator set (20), comprising a sensor (50) for the type of flooring and a fuzzy logic control unit (46). The automatic control device (30) of the invention further includes a sensor (60) for detecting the dynamic movement of the suction unit (7), wherein the fuzzy logic control unit (46) is adapted to apply a fuzzy inference operation to the output of the floor-type sensor (50) and to the output of the suction unit dynamic movement sensor (60), so as to control the motor-ventilator set (20) on the basis of the fuzzy inference operation.

9 Claims, 6 Drawing Sheets

VACUUM CLEANER WITH FUZZY LOGIC CONTROL UNIT

FIELD OF THE INVENTION

The present invention relates to vacuum cleaners which comprise a housing having a dust compartment containing a dust bag, and a suction compartment communicating with the dust compartment by an opening for the flow of air and comprising a motor-fan group; and a suction nozzle of which one of the ends communicates with the dust bag by a connection opening provided in the housing and of which the other end is coupled to a suction member having a suction opening.

It relates more particularly to vacuum cleaners which comprise also an automatic control device of the power of the motor-fan group, of the type comprising means for detecting the nature of the floor and fuzzy logic control means.

BACKGROUND OF THE INVENTION

In known vacuum cleaners with so-called fuzzy logic, the detection means of the nature of the floor comprise generally a detector of the vacuum existing between the motor-fan group and the dust compartment, the fuzzy inference being then established by the detected vacuum so as to control automatically the power of the motor-fan group according to the result of this fuzzy inference. If such vacuum cleaners with fuzzy logic have effectively a good automatic regulation of the power of the motor-fan group thanks to the detected vacuum, their power on the other hand is not at all adapted automatically as a function of the nature of the floor encountered and of a pushing force acceptable for the user, thereby reducing substantially the efficiency of the cleaner, as well as the working comfort of the user. Thus, the problem arises that in fact, in certain types of floor covering (wall to wall or thick carpet), the suction attachment becomes too hard to push because of the too great "load" due to the vacuum which tends to grip the accessory to the wall to wall carpet or rug, from which results fatigue and pushing effort altogether unacceptable to the user.

SUMMARY OF THE INVENTION

The invention has in particular the object of overcoming these drawbacks and providing, in a simple and effective manner, a vacuum cleaner with fuzzy logic, of the type described above, whose power of the motor-fan group will be automatically adapted as a function of the nature of the floor encountered whilst providing to the user a pushing force of the suction member which will be completely acceptable to clean under the best conditions possible.

According to the invention, the automatic control device comprises also detection means of the dynamic displacement of the suction member, and fuzzy logic control means are adapted to provide a fuzzy inference at the outlet of the detection means for the nature of the floor and at the outlet of the detection means for dynamic displacement of the suction member so as to control the power of the motor-fan group according to the result of said inference.

Thus, thanks to this combination of detection means of the nature of the floor and detection means of the dynamic displacement of the suction member, the power of the cleaner with fuzzy logic and, concomitantly, the force of displacement of the suction member, are completely suitable no matter what the nature of the floor encountered.

Preferably, the detection means of the dynamic displacement of the suction member are constituted by detection means of the mean speed of said suction member.

The invention also has for its object to provide an automatic adaptation of the power of the motor-fan group of the cleaner, not only as a function of the nature of the floor and of the force of displacement of the suction member exerted by the user, but also as a function of the degree of filling of the dust bag.

Thus, according to one particularity of the invention, the detection means of the nature of the floor comprise a detector of the vacuum existing between the motor-fan group and the dust compartment, and the automatic control device comprises also means permitting calculating sequentially a so-called diaphragm value, defined as a function of the suction opening of the suction member and representative of the nature of the floor and of the degree of filling of the dust bag, by means of a computer adapted to determine successively: the air flow rate of the motor-fan group from a first table of correspondence between the suction and the control voltage of the motor-fan group; a so-called pneumatic parameter obtained from a second table of correspondence between the suction and the flow rate of air; and the diaphragm correlated to the pneumatic parameter previously determined, fuzzy inference using the diaphragm and the mean speed of the suction member as input variables and elaborating as a control variable the control voltage of the motor-fan group, this control voltage being applied in counter-reaction to the computing means of the diaphragm.

BRIEF DESCRIPTION OF THE DRAWINGS

The characteristics and advantages of the invention will become apparent from the description which follows of a particular embodiment given by way of non-limiting example, with reference to the accompanying drawings, in which.

DESCRIPTION OF THE PREFERRED EMBODIMENTS

Figure 1:
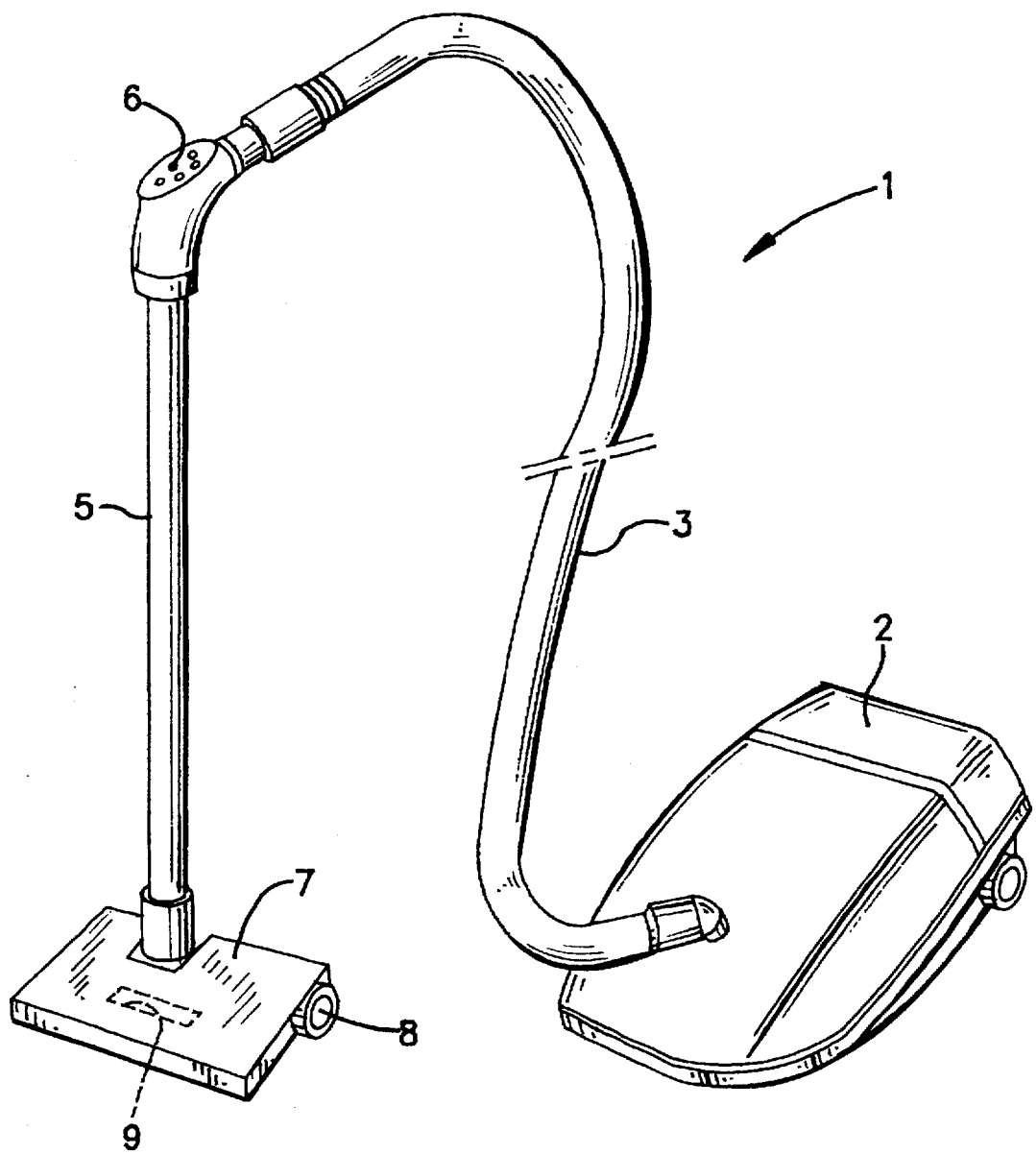
FIG. 1 is a partial schematic perspective view of a vacuum cleaner according to the invention.

In the embodiment shown schematically in FIG. 1, the vacuum cleaner 1 of the fuzzy logic type is a push type machine which comprises a principal housing 2, two connected suction tubes, namely a flexible tube 3 connected to an opening 4 (FIG. 2) provided in front of the upper portion of the housing 2, and a rigid tube 5 provided with a grip 6 with control buttons, as well as a suction member 7 provided with rollers 8 of which only a single one is visible in FIG. 1, connected to the free end of the rigid tube 5 and having a suction opening 9 shown in dotted lines in FIG. 1.

Figure 2:
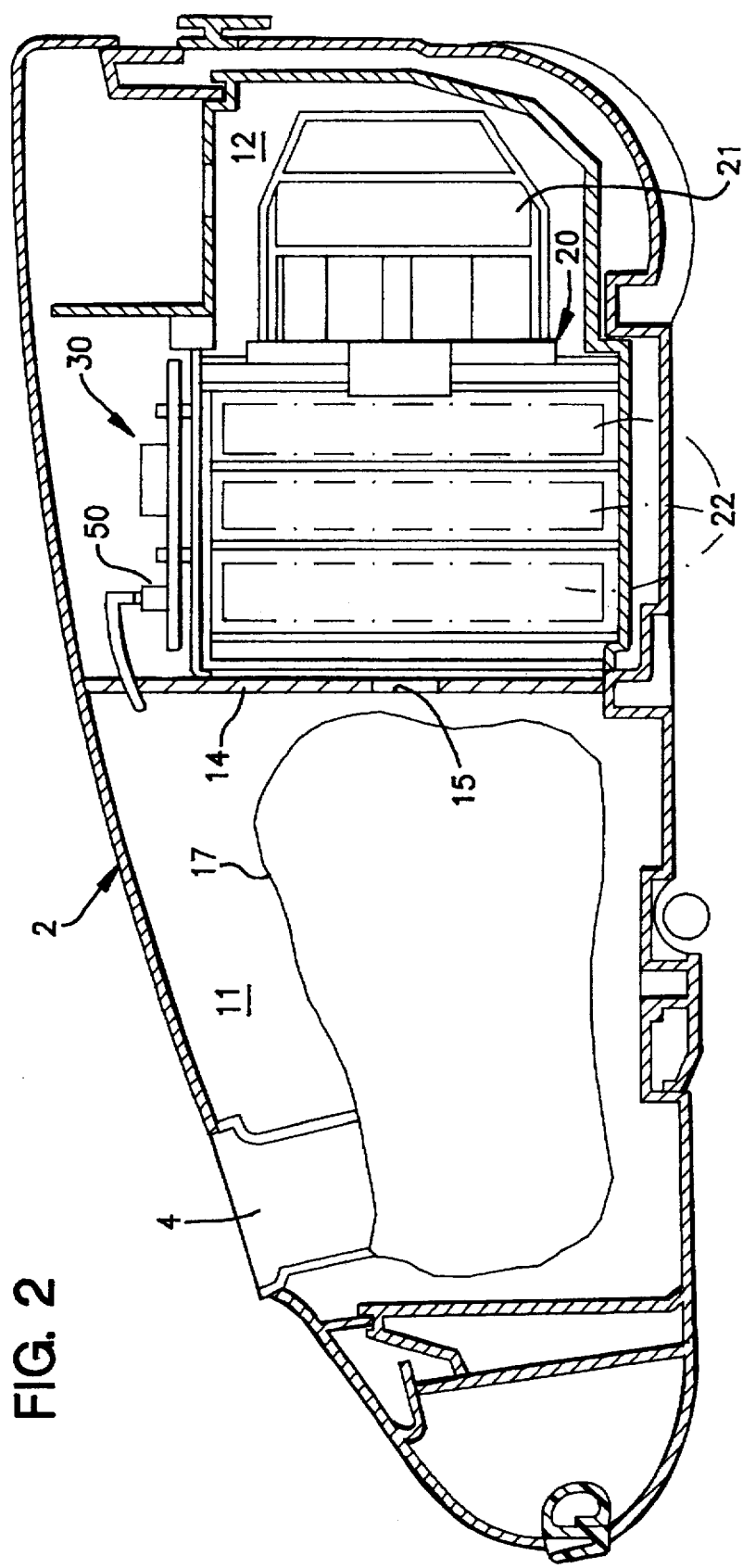
FIG. 2 is an enlarged schematic view in longitudinal cross section of a housing of the cleaner of FIG. 1.

In an embodiment that is nowise limiting, shown in FIG. 2, the housing 2 of the cleaner comprises two compartments 11 and 12 separated from each other by a vertical partition 14 and communicating with each other through an air flow opening 15 provided in the partition 14, namely:

a dust compartment 11 holding a removably mounted dust bag 17, in a known manner, in communication with the opening 4;

a suction compartment 12 containing a motor-fan group 20 comprising a motor 21 and at least one fan 22, in this case three fans.

In this FIG. 2, there is shown schematically by the general reference numeral 30 an automatic control device for the cleaner, arranged in the suction compartment 12 of the housing 2 and adapted to adjust automatically by fuzzy logic the power of the motor-fan group 20 of the cleaner as a function of the conditions of use of this latter, namely: the nature of the floor encountered, the degree of filling of the dust bag 17 and the pushing force exerted by the user on the suction member 7.

Figure 3:
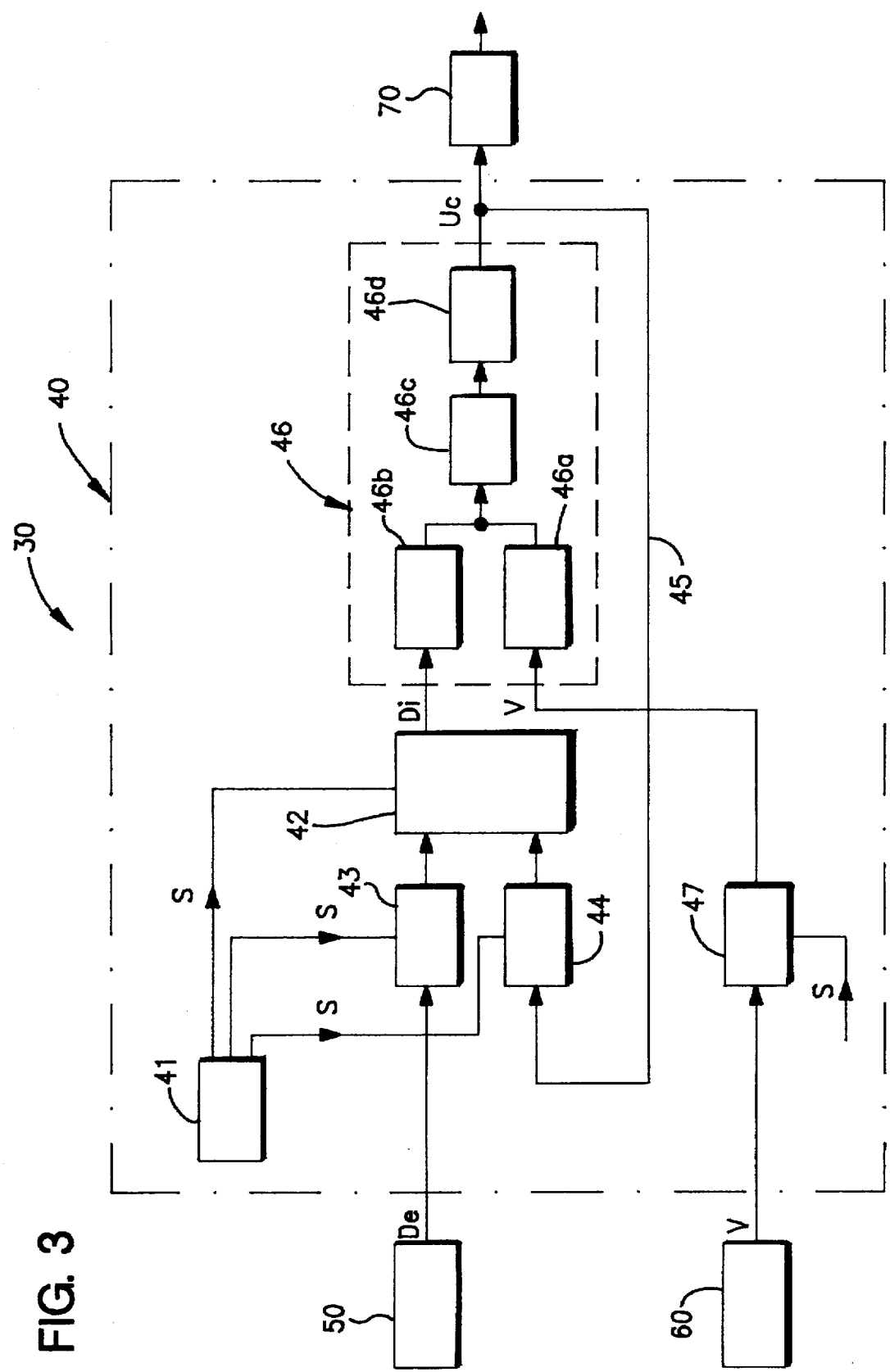
FIG. 3 is a block diagram of an automatic control device of the cleaner of FIG. 1.

FIG. 3 shows in the form of a block diagram the automatic control device 30 for the power of the motor-fan group of the cleaner, according to the invention, which will now be described.

In this FIG. 3, the automatic control device 30 is in a general form of a 4-bit microcontroller shown at 40 by mixed lines, which comprises an internal clock 41 generating periodically, for example every 500 milliseconds, a clock signal S, and which receives at this frequency, on the one hand, first data denoted De, representative of the nature of the floor encountered and corresponding to the vacuum which exists between the motor-fan group 20 and the dust compartment 11 of the cleaner and which is collected by the means 50 for detection of the nature of the floor and comprising for this purpose a differential pressure detector, of structure known per se (see FIG. 2), and on the other hand, a second data designated V, representative of the pushing force exerted by the user on the suction member 7 and corresponding to the mean speed of displacement of the suction member which is supplied by the means 60 mounted on said suction member 7 and suitable to detect the mean speed of this latter.

It will be noted that the means 60 for detection of the mean speed of the suction member can be replaced by any other means adapted to detect the dynamic displacement of the suction member 7, this dynamic displacement being characterized for example by the acceleration of the suction member or again by the force exerted on the suction member, without thereby departing from the scope of the invention.

The microcontroller 40, FIG. 3, provides at its output a signal, designated $U_c$, representative of the control voltage which is applied to the motor-fan group 20 (FIG. 2) to adjust the power of this latter, by means of a control member 70, such as a triac.

Figure 4:
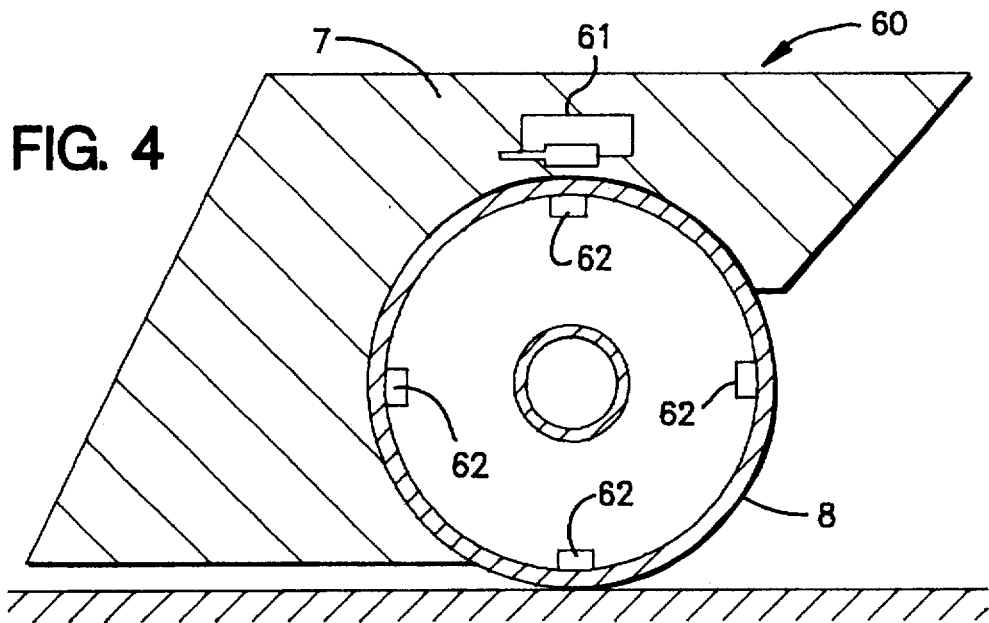
FIG. 4 is an enlarged schematic view in transverse cross section of a suction member of the cleaner of FIG. 1.

In a non-limiting embodiment shown in FIG. 4, the means 60 for detection of the mean speed of the suction member 7 comprise a Hall effect detector 61 disposed in the suction member 7, tangentially to one of the wheels 8, and a plurality of magnets 62, for example four in number, distributed regularly about the circumference of said wheel 8. The mean speed of the suction member 7 relative to the floor is calculated by any suitable means for counting the number of impulses created during a given period of time by passage of the magnets 62 before the Hall effect detector 61; the image of this mean speed thus calculated represents the force of displacement of the suction member 7 on the floor that is encountered.

Referring to FIG. 3, the microcontroller 40 comprises means 42 permitting calculating periodically from the clock signal S, a so-called diaphragm value equivalent to the degree of closing of the suction opening 9 of the suction member 7 (FIG. 1), which is representative of the nature of the floor encountered and of the degree of filling of the dust bag 17 (FIG. 2), and whose determination will be explained hereinafter. These means 42 for calculation of the diaphragm have a first input connected to a first numerical filter 43, known per se, adapted to filter the vacuum De measured by the pressure detector 50, a second input connected to a second numerical filter 44 adapted to filter the control voltage called $U_c$ via a counter-reaction connection 45, and constituting itself a retard line permitting taking account of the proper inertia of the motor-fan group, and an output delivering the calculated diaphragm, designated Di.

Figure 5:
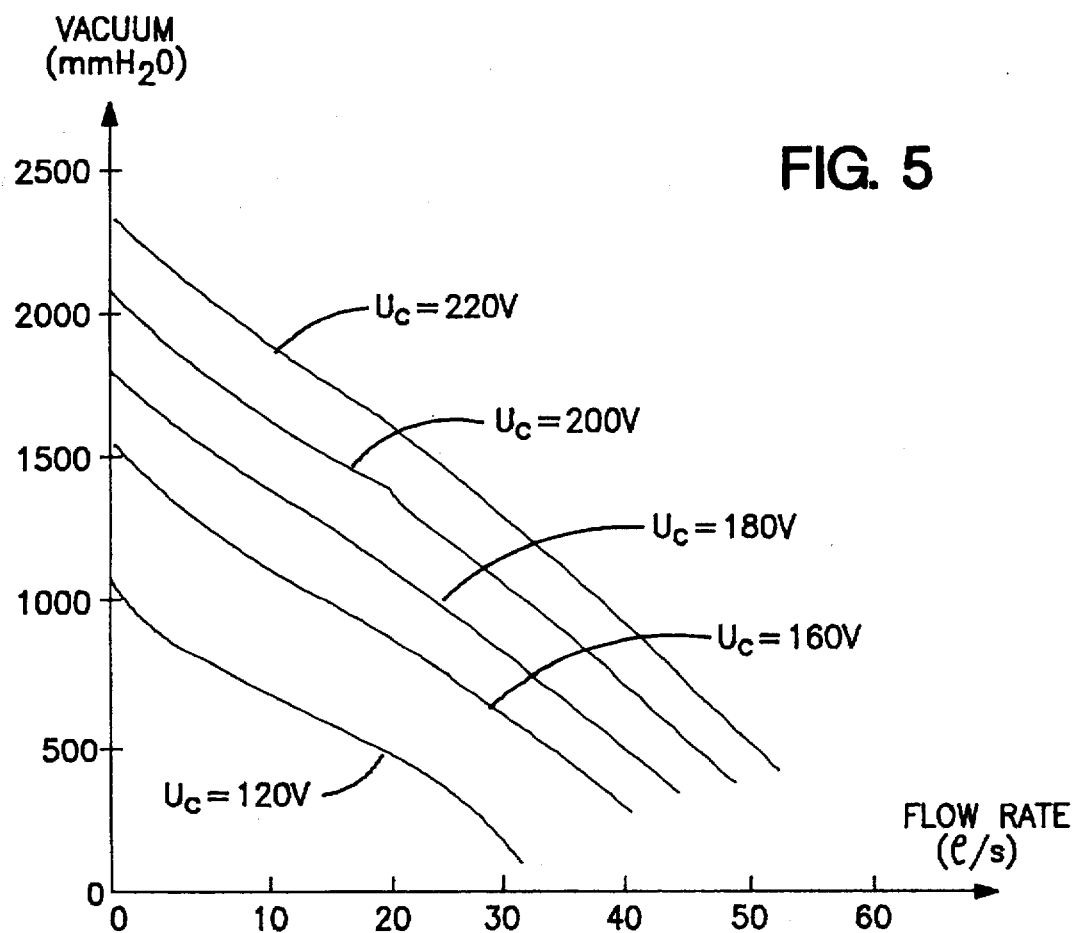
FIG. 5 is the network of characteristics of the vacuum as a function of the flow rate of air for different voltages of the motor-fan group showing in FIG. 2.

More particularly, the means 42 for calculation of the diaphragm are constituted by a computer adapted to determine successively:

the air flow rate, designated Da (in l/s), of the motor-fan group 20 (FIG. 2) from a correspondence table, established particularly by an abacus of the type shown in FIG. 5, between the vacuum De (varying from 0 to 2500 mm of a water column) and the established control voltage $U_c$ of 120 to 220 Volts;

a so-called pneumatic parameter, designated the coefficient k, which is characteristic of the pneumatic load "seen" by the motor-fan group, and which is obtained from a table of correspondence between the vacuum De and the air flow Da, according to the following relationship:

$$\text{coef. } k = \frac{De}{(Da)^2}$$

the diaphragm Di, expressed in millimeters, which is obtained by correlation, according to an approximated linear equation by a straight line of logarithmic coordinates, with the parameter coef. k defined above.

In FIG. 3, microcontroller 40 comprises moreover a unit 46 for control with fuzzy logic receiving two input variables, namely the diaphragm Di and the mean speed V, filtered by a numerical filter 47 known per se, of the suction member, and giving the control variable, in this case the control voltage $U_c$ to be applied to the motor-fan group of the cleaner so as to adjust the power of this latter as a function of conditions of use.

This control unit 46 with fuzzy logic comprises means 46a adapted to determine, from the membership function relative to the speed of the suction member, the degree of membership for each predicate of the speed, means 46b adapted to determine, from the membership function relating to the diaphragm, the degree of membership for each predicate of the diaphragm, a fuzzy inference motor 46c using for example the MIN-MAX method and permitting, from a statement of the control rules and from the membership function relative to the control voltage $U_c$, determining the degree of membership for each predicate of the control voltage, as well as means 46d for so-called fuzziness collection and adapted to determine the value of the control voltage to be applied to the motor-fan group of the cleaner.

Figure 6:
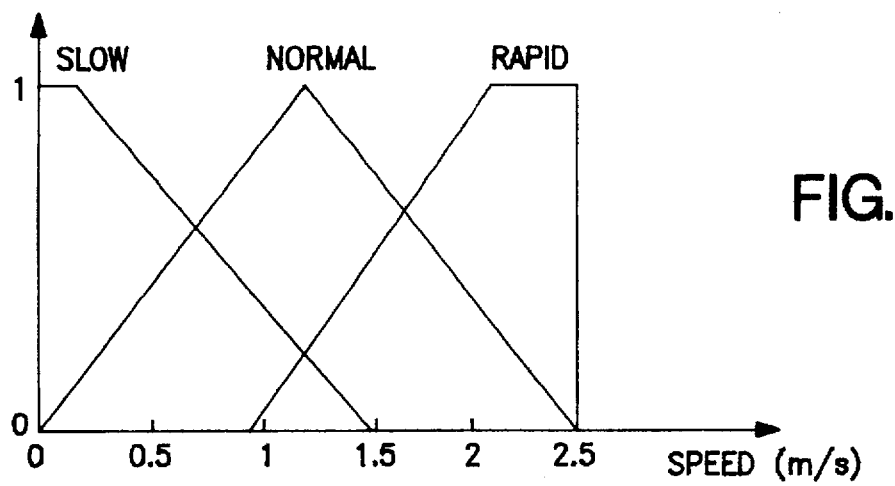
FIGS. 6, 7 and 8 show curves of the membership functions used in the fuzzy control of the cleaner and relative respectively to the two input variables (speed, FIG. 6 and diaphragm, FIG. 7) and to the control variable (voltage, FIG. 8)
Figure 7:
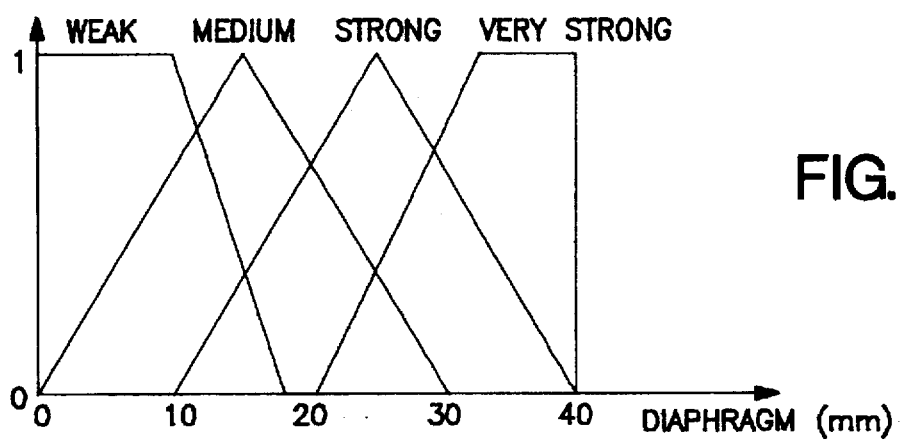
Figure 8:
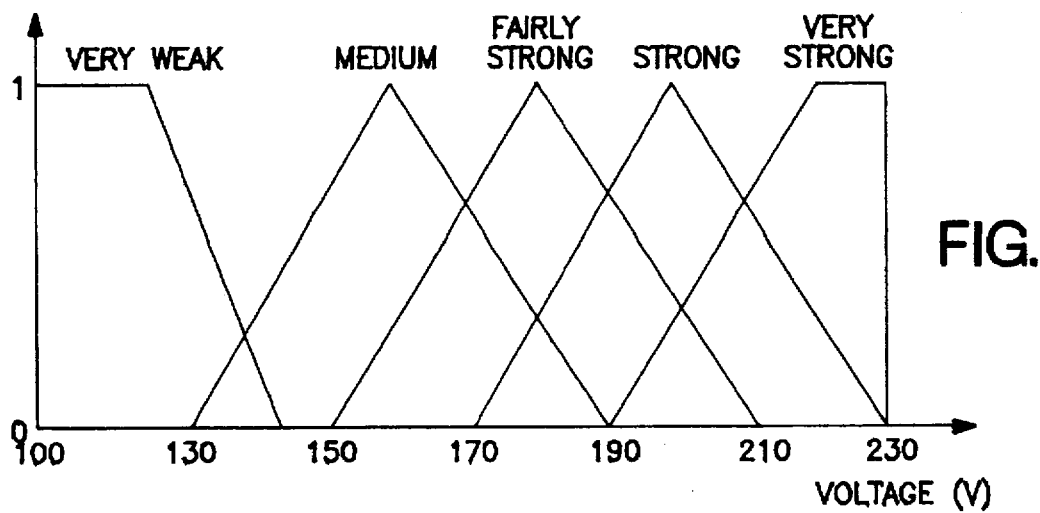

FIG. 6 shows the membership function of the speed (comprised for example between 0 and 2.5 m/s) of the suction member, determined experimentally and having three predicates, namely "Slow", "Normal" and "Rapid". FIG. 7 also shows the membership function of the diaphragm (comprised for example between 0 and 40 mm), defined experimentally and having four predicates, namely "Weak", "Medium", "Strong", and "Very Strong". FIG. 8 also shows the membership function of the control voltage (comprised between 110 and 230 V) of the motor-fan group, defined experimentally and having for example five predicates, namely "Very Weak", "Medium", "Fairly Strong", "Strong" and "Very Strong".

The control rules elaborated from experience and transcribed by using fuzzy descriptions of the three variables, respectively the speed (FIG. 6), the diaphragm (FIG. 7) and the control voltage (FIG. 8) can be established in the form of the table below.

|        | DIAPHRAGM   |               |              |                |
|--------|-------------|---------------|--------------|----------------|
| SPEED  | WEAK        | MEDIUM        | STRONG       | VERY STRONG    |
| SLOW   | STRONG      | MEDIUM        | VERY WEAK    | MEDIUM         |
| NORMAL | VERY STRONG | FAIRLY STRONG | MEDIUM       | STRONG         |
| RAPID  | VERY STRONG | VERY STRONG   | VERY STRONG  | VERY STRONG    |

These different control rules can be set forth in the following manner, from this table:

Rule 1: If the speed is slow and the diaphragm is weak, then the control voltage is strong.
Rule 2: If the speed is normal and the diaphragm is weak, then the control voltage is very strong.
Rule 3: If the speed is rapid and the diaphragm is weak, then the control voltage is very strong.
Rule 4: If the speed is slow and the diaphragm is medium, then the control voltage is medium.
Rule 5: If the speed is normal and the diaphragm is medium, then the control voltage is fairly strong.
Rule 6: If the speed is rapid and the diaphragm is medium, then the control voltage is very strong.
Rule 7: If the speed is slow and the diaphragm is strong, then the control voltage is very weak.
Rule 8: If the speed is normal and the diaphragm is strong, then the control voltage is medium.
Rule 9: If the speed is rapid and the diaphragm is strong, then the control voltage is very strong.
Rule 10: If the speed is slow and the diaphragm is very strong, then the control voltage is medium.
Rule 11: If the speed is normal and the diaphragm is very strong, then the control voltage is strong.
Rule 12: If the speed is rapid and the diaphragm is very strong, then the control voltage is very strong.

With respect to FIG. 3, the operation of the automatic control device 30 of the cleaner, according to the invention, is as follows:

In a periodic manner coordinated by the clock 41, the means 50 for detection of the nature of the floor encountered deliver a signal which is representative of the vacuum De existing between the motor-fan group 20 and the dust compartment 11 of the cleaner (FIG. 2) and which is applied, after filtering, to the means 42 for calculation of the diaphragm Di, whilst the means 60 for detection of the mean speed of the suction member delivers a signal which is representative of said measured mean speed V and which is applied, after filtering, to one of the two inputs of the fuzzy logic control unit 46.

Simultaneously, the signal representative of the control voltage $U_c$ supplying the motor-fan group of the cleaner is applied with counter-reaction, via the connection 45 and after filtering, to the means 42 for computation of the diaphragm Di.

By application of the computation process of the diaphragm which causes to intervene, as described above, the determination of the flow rate of air of the motor-fan group, then the determination of the pneumatic parameter and finally the determination of the diaphragm correlated to said pneumatic parameter, the computer 42 delivers a signal which is representative of the calculated diaphragm Di and which is applied to the other input of the fuzzy logic control unit 46.

For the sake of understanding, there will now be described the different steps used by the fuzzy control unit 46 using a numerical example of the measured speed V and of the calculated diaphragm Di, with reference to FIGS. 9 to 11.

Figure 9:
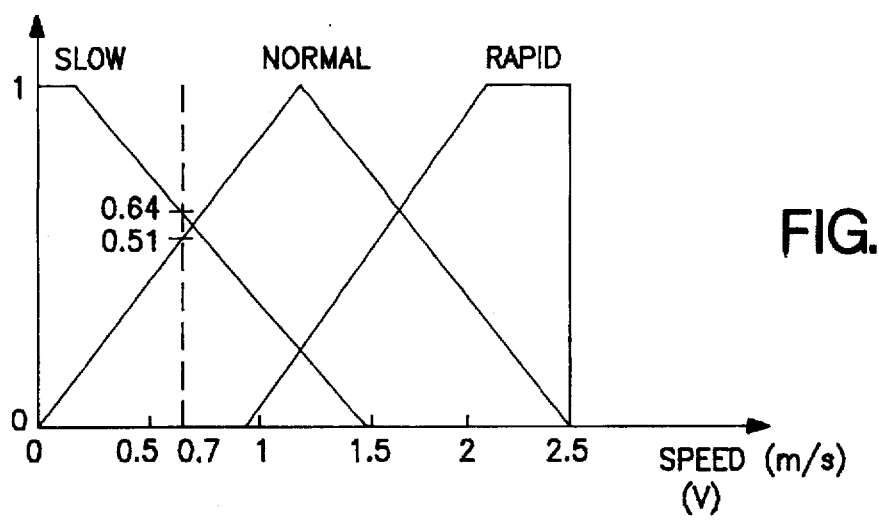
FIGS. 9 and 10 are views analogous respectively to FIGS. 6 and 7, in the framework of a numerical example.

Thus, in FIG. 9, the measured speed V is equal to 0.7 m/s, which corresponds to a "Slow" speed with a membership degree equal to 0.64, "Normal" with a membership degree equal to 0.51, and "Rapid" with a membership degree equal to 0.

Figure 10:
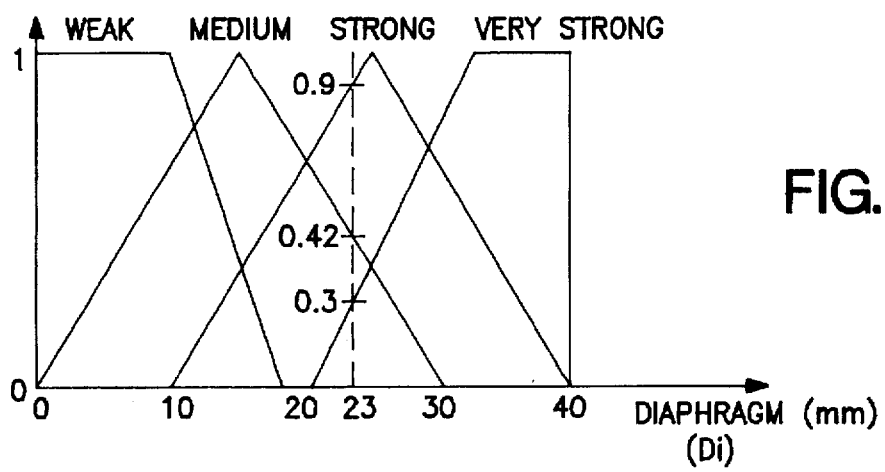

In FIG. 10, the calculated diaphragm Di is equal to 23 millimeters which, given its computation according to the process used, can be considered as representative of wall or wall or fairly thick carpet, with an almost empty dust bag. This calculated diaphragm Di, FIG. 10, corresponds in fact to a "Weak" diaphragm with a membership degree equal to 0, "Medium" with a membership degree equal to 0.42, "Strong" with a membership degree equal to 0.9, and "Very Strong" with a membership degree equal to 0.3.

The fuzzy logic utilizes the MIN-MAX which consists in the first instance in applying the control rules mentioned above by taking for each couple of degrees of membership according to the different predicates of the speed and of the diaphragm, the minimum value (equivalent to an ET logic) of this couple of degrees of membership, and in the second instance, in determining the degree of membership of each predicate of the control voltage by taking the maximum value of the minimum values of each predicate of the control voltage constituting the conclusion of each rule previously applied. This fuzzy inference can then be represented by the two following tables:

|       | DIAPHRAGM |      |      |     |
|-------|-----------|------|------|-----|
| SPEED | 0         | 0.42 | 0.9  | 0.3 |
| 0.64  | 0         | 0.42 | 0.64 | 0.3 |
| 0.51  | 0         | 0.42 | 0.51 | 0.3 |
| 0     | 0         | 0    | 0    | 0   |

| VOLTAGE ($U_c$) |        |               |        |             |
|-----------------|--------|---------------|--------|-------------|
| VERY WEAK       | MEDIUM | FAIRLY STRONG | STRONG | VERY STRONG |
| DEGREE 0.64     | 0.51   | 0.42          | 0.3    | 0           |

Thus, according to these tables, after use of the MIN-MAX method, the control voltage has a "Very Weak" predicate with a membership degree equal to 0.64, a "Medium" predicate with a degree of membership equal to 0.51, a "Fairly Strong" predicate with a degree of membership equal to 0.42, a "Strong" predicate with a degree of membership equal to 0.3, and a "Very Strong" predicate with a degree of membership equal to 0.

Figure 11:
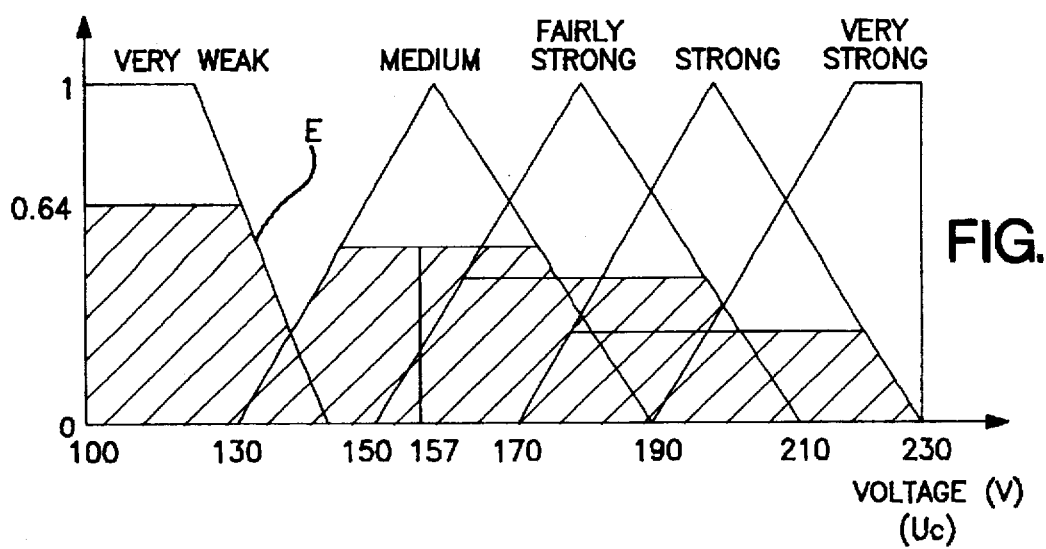
FIG. 11 shows, from the curve of the membership function of the control voltage shown in FIG. 8, the determination of the value of the control voltage resulting from the fuzzy inference.

The fuzziness collection, shown in FIG. 11, consists of the membership function of the control voltage (FIG. 8) to which is connected the preceding membership degree determined for each predicate of said voltage so as to form a distribution law shown in FIG. 11 by the different cross-hatched areas whose overall envelope is designated by E, in determining the value of the control voltage $U_c$ for example by use of the known method of research for the center of gravity of the overall cross-hatched region. In the selected example, FIG. 11, the control value $U_c$ is equal to 157 volts, and is applied to the motor-fan group, by means of the control member 70 (FIG. 3), so as to adjust the power of the cleaner such that the user, in this example, can clean wall to wall or carpet of the fairly thick type, with a dust bag not much filled, by exerting on the suction member of the cleaner a pushing effort which is completely acceptable and suitable for this type of floor covering.

What is claimed is:

1. A vacuum cleaner comprising:
   a housing having a dust compartment which contains a dust bag, having a suction compartment connected to the dust compartment through an air flow opening, and having a motor-fan group;
   a dynamically displaceable suction member having a suction opening;
   a suction nozzle having two ends, a first end being connected to the dust bag through a connection opening provided in the housing, and a second end being connected to the suction member; and
   an automatic control device of power to the motor-fan group including means for detecting the nature of the floor having a detector of vacuum between the motor-fan group and the dust compartment, means for determining mean speed of said suction member, and fuzzy logic control means for providing fuzzy inference at an output of said means for detecting the nature of the floor and at an output of said means for detecting the dynamic displacement of said suction member, and for controlling power to said motor-fan group according to a result of said fuzzy inference, the result representing a relationship between the nature of the floor and the dynamic displacement of said suction member,
   the automatic control device including means for calculating sequentially a diaphragm value, defined as a function of the suction opening and representative of the nature of the floor and of a degree of filling of the dust bag by means for determining successively: an air flow rate of the motor-fan group from a first table of correspondence between the vacuum and a control voltage of the motor-fan group; a pneumatic parameter obtained from a second table of correspondence between the vacuum and the air flow rate; and the diaphragm value correlated to the pneumatic parameter previously determined, the fuzzy logic control means for using the diaphragm value and the mean speed of the suction member as input variables and for outputting a control voltage of the motor-fan group, the control voltage being fed back to said means for calculating a diaphragm value.

2. Vacuum cleaner according to claim 1,
   wherein the automatic control device includes first filtering means for filtering a vacuum signal and for outputting a filtered vacuum signal to the means for calculating a diaphragm value, second filtering means for filtering a control voltage signal and for outputting a filtered control voltage signal to the means for calculating a diaphragm value, and third filtering means for filtering a mean speed signal and for outputting a filtered mean speed signal to the fuzzy logic control means.

3. Vacuum cleaner according to claim 2,
   wherein the means for calculating a diaphragm value, the fuzzy logic control means, and the first, second and third filtering means include a same microcontroller.

4. Vacuum cleaner according to claim 3,
   wherein the suction member includes a wheel, the means for detecting the mean speed of the suction member including a Hall effect detector disposed in the suction member, tangentially to the wheel, said wheel having a plurality of magnets distributed regularly about a circumference of said wheel.

5. Vacuum cleaner according to claim 2,
   wherein the suction member includes a wheel, the means for detecting the mean speed of the suction member including a Hall effect detector disposed in the suction member, tangentially to the wheel, said wheel having a plurality of magnets distributed regularly about a circumference of said wheel.

6. Vacuum cleaner according to claim 1,
   wherein the suction member includes a wheel, the means for detecting the mean speed of the suction member including a Hall effect detector disposed in the suction member, tangentially to the wheel, said wheel having a plurality of magnets distributed regularly about a circumference of said wheel.

7. A vacuum cleaner comprising:
   a housing having a dust compartment which contains a dust bag, and having a suction compartment connected to the dust compartment through an air flow opening and having a motor-fan group;
   a dynamically displaceable suction member having a suction opening;
   a suction nozzle having two ends, a first end being connected to the dust bag through a connection opening provided in the housing, and a second end being connected to the suction member; and
   an automatic control device of power to the motor-fan group including means for detecting the nature of the floor, means for detecting dynamic displacement of said suction member, and fuzzy logic control means for providing fuzzy inference at an output of said means for detecting the nature of the floor and at an output of said means for detecting the dynamic displacement of said suction member, and for controlling power to said motor-fan group according to a result of said fuzzy inference, the result representing a relationship between the nature of the floor and the dynamic displacement of said suction member.

8. Vacuum cleaner according to claim 7,
   wherein said means for detecting the dynamic displacement of the suction member includes means for detecting the mean speed of said suction member.

9. Vacuum cleaner according to claim 8,
   wherein the suction member includes a wheel, the means for detecting the mean speed of the suction member including a Hall effect detector disposed in the suction member, tangentially to the wheel, said wheel having a plurality of magnets distributed regularly about a circumference of said wheel.

* * * * *